June 3, 1969 G. B. YNTEMA 3,447,913
SUPERCONDUCTING COMPOSITE MATERIAL
Filed March 18, 1966 Sheet 1 of 3

INVENTOR
George B. Yntema

BY Le Blanc & Shur
ATTORNEYS

June 3, 1969 | G. B. YNTEMA | 3,447,913

SUPERCONDUCTING COMPOSITE MATERIAL

Filed March 18, 1966 | Sheet 2 of 3

EFFECT OF PREPARATION PRESSURE ON CRITICAL FIELD In+25% $TiO_2$ PELLETS

*INVENTOR*
George B. Yntema

*BY* Le Blanc & Shur
*ATTORNEYS*

CRITICAL FIELDS OF Sn+25% $TiO_2$
PELLETS DRAWN TO WIRES

INVENTOR
George B. Yntema

BY Le Blanc & Shur
ATTORNEYS 3,447,913

SUPERCONDUCTING COMPOSITE MATERIAL

George B. Yntema, R.R. 2, Box 80A, Manchester, Conn. 06040

Filed Mar. 18, 1966, Ser. No. 535,407
Int. Cl. H01s 4/00
U.S. Cl. 29—191.2 11 Claims

ABSTRACT OF THE DISCLOSURE

Disclosed is a composite superconductor comprising a superconductive matrix in which is embedded solid discrete particles of a non-superconducting and non-conducting material. The particles are preferably closely packed as determined by the penetration depth and the coherence length of the material of the matrix.

This invention relates to a composite material for forming superconductors and more particularly to wires, pellets, and other superconductors which exhibit geometrically continuous regions of superconductivity, even when subjected to intense magnetic fields. The superconductors are capable of transmitting intense electrical currents without degradation of electrical or magnetic energy into heat.

As is well known, superconductors are used for a wide variety of purposes, often in the form of coiled wires through which pass large or intense electrical currents, for the purposes of obtaining high intensity magnetic fields with a maximum efficiency. Although a great many materials are known to be superconducting when at a suitably low temperature, each may be rendered normal (not superconducting) by the application of a sufficiently intense magnetic field. The strength of magnetic field necessary for the destruction of superconductivity depends upon the material and the operating temperature. This factor normally limits the current which may pass through a coiled superconductor, since the individual turns of a coil are each subjected to the field of its own current plus that due to the current in all the other windings of the coil. Sufficiently large currents through the coil tend to create intense magnetic fields which in turn reduce or destroy the superconducting properties of the material forming the coil turns.

In addition, it is sometimes important that a superconductor transmit electrical current of great density without significant degradation of electrical or magnetic energy into heat. Such degradation wastes otherwise useful energy, tends to destroy superconductivity in the material, and imposes a load on whatever system is employed for refrigeration of the material. One or more of these effects of energy degradation may be highly undesirable in a particular application. Furthermore, provision of a geometrically continuous superconducting path for the electrical current is not always sufficient to prevent such degradation.

It is also sometimes highly desirable that a superconductive material both provide a geometrically continuous region of superconductivity in intense magnetic field, and at the same time transmit electrical current of great density without degradation of electrical or magnetic energy into heat.

The present invention provides a novel composite material for forming superconductors, having significantly improved properties over prior constructions. In the present invention the wire, pellet, bar, or other superconductor is formed as a heterogeneous or composite structure consisting of two (or more) materials, one of which is a metal, alloy, compound, or similar material which is superconducting at the temperature of intended use, while the other material is non-metallic, such as an insulator, semiconductor, or the like.

Although the exact physical phenonema which make the composite superconducting material of the present invention possess superconducting properties in much greater or more intense magnetic fields than heretofore possible, and at the same time provide a significant reduction in the heat losses in the conductor are not fully understood on a quantitative basis, these two significantly improved properties are believed to be related to the manner in which vortices are fostered and controlled in the composite superconductor. More specifically, it is believed that the inhomogenous material in providing boundaries between metallic and non-metallic portions of the material significantly enhances the formation of vortices. The enhanced vortex formation in turn is believed to render the material less susceptible to magnetic fields, such that the superconductor retains its superconducting properties in magnetic fields having intensities of two to five times or more greater than previous superconducting materials. Heat loss in the superconductor on the other hand is believed to be related to vortex movement in the material. The metallic-non-metallic boundaries, while enhancing the formation of vortices, are believed at the same time to have a stabilizing effect on the vortices, tending to prevent their circulation through the superconductor. The result is that less electrical and magnetic energy is lost in the form of heat in the superconducting material.

It is therefore one object of the present invention to provide an improved composite superconducting material.

Another object of the present invention is to provide a superconductor having one or both of the properties of increased insensitivity to magnetic fields and lower heat loss.

Another object of the present invention is to provide a superconductor in which particles, granules or filaments of materials not conductive in the manner of metals and not superconductive are distributed throughout and embedded in a medium or matrix of a material exhibiting superconductivity.

Another object of the present invention is to provide an improved superconducting material and superconductors formed therefrom with spaced metallic-non-metallic boundaries for enhancing the formation and stabilization of vortices in the composite material or superconductor. This is brought about by embedding in a superconductor a plurality of small size particles of a material which is not a superconductor and which does not exhibit metallic-type conduction, at room temperature. The material of the matrix is preferably a superconducting metal (or alloy) but may be formed of a heavily doped semiconductor or other material which exhibits superconductivity at low temperatures. The particular materials embedded in the matrix are preferably selected from the group of well-known electrical insulators, but may include any material which is not superconducting and does not exhibit metallic-like conduction. This includes semiconductors and other materials in which electrical conduction is not by way of a so-called Fermi sea.

The size of the embedded or surrounded particles is preferably quite small and is related to parameters of the material forming the matrix, namely, the magnetic field penetration depth of the matrix material and its coherence length. That is, the particle size should be chosen in relation to the smaller of these two parameters and preferably should not be more than a couple of orders of magnitude larger than the smaller of the two. Particle diameters of as much as 60 microns have been utilized, and it is believed that particles having diameters of as large as 100 microns will operate satisfactorily under certain conditions. However, the preferred range of diameters of the particles embedded in the metallic matrix of the super conductor is preferably on the order of from one micron to one-one thousandth of a micron.

These and further objects and advantages of the invention will be more apparent upon reference to the following specification, claims and appended drawings wherein:

FIGURE 1 is a cross section through a body of composite superconductive material, constructed in accordance with the present invention;

FIGURE 2*a* is a cross section through a super conducting wire formed in accordance with this invention in which is embedded a plurality of parallel, elongated nonconductive filaments;

FIGURE 2*b* is a cross section through the wire of 2*a*, taken at right angles to that figure;

Figure 1:
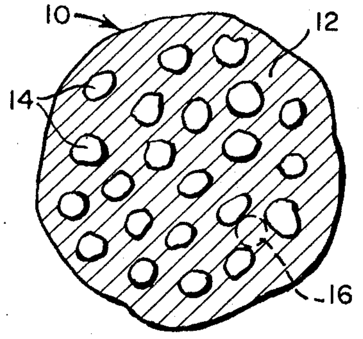

Referring to the drawings, FIGURE 1 shows a body of super conductive material formed in accordance with the present invention and generally indicated at 10. The composite body 10 is preferably formed with a matrix 12 of superconducting metal but may be of any superconducting material. Embedded throughout the matrix 12 are a plurality of particles 14, preferably formed of electrical insulating material. The particles 14 are preferably uniformly distributed throughout the matrix 12, and the particles may or may not be in such close proximity as to touch each other. However, the particles should be closely packed such that a small sphere 16 may be drawn adjacent the particles and wholly contained within the matrix material 12 in a manner more fully described below.

Figure 2A:
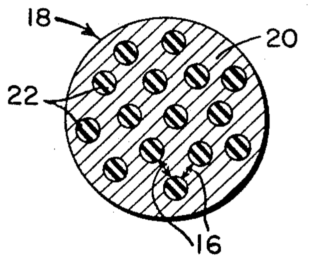
Figure 2B:
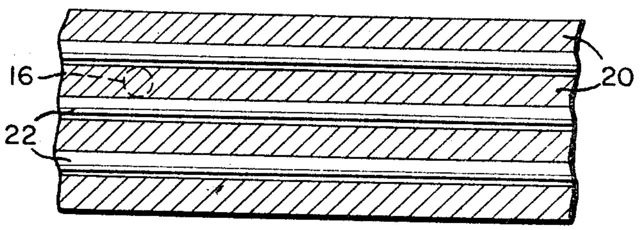

FIGURE 2*a* illustrates a modified embodiment in the form of a superconducting wire 18 formed from a superconducting matrix 20 in which are embedded a plurality of elongated insulating filaments 22. FIGURE 2*b* is a cross section along the longitudinal axis of the wire 18 taken at right angles to the cross section of FIGURE 2*a*. This figure illustrates that the insulating filaments 22 extend generally parallel to the longitudinal axis of the wire, and the preferred spacing between metallic-non-metallic boundaries is again illustrated at 16 in these two figures.

Figure 3:
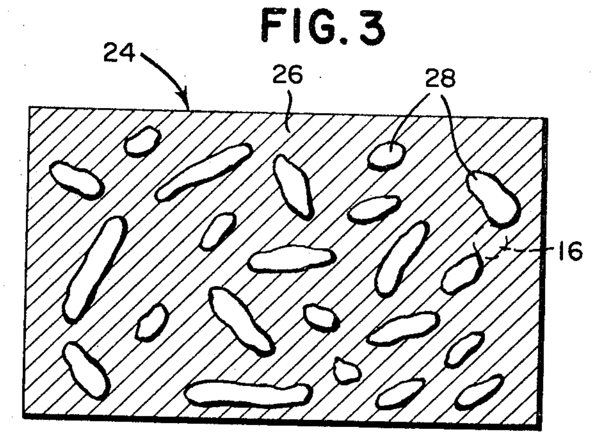
FIGURE 3 illustrates a further modification showing a cross section through a cylindrical pellet constructed in accordance with the present invention.

FIGURE 3 illustrates a superconducing pellet formed in accordance with the present invention and illustrates a vertical section through a pellet formed as a right circular cylinder. Again, the matrix 26 of the pellet 24 is a material exhibiting superconductivity at low temperatures, while the embedded particles 28, may be chosen from materials which are not superconducting at low temperatures and do not conduct like metals at normal or room temperatures. In the preferred embodiment matrix 26 is a potentially superconductive metal while particles 28 are formed of electrically insulating metal. The particles are illustrated in FIGURE 3 as of elongated configuration, and are randomly oriented within the matrix. The filaments in this embodiment do not form a regular array, but instead are matted together so that they form a sort of felt, which is impregnated with the potentially superconducting material of the matrix. Sphere 16 again represents the preferred spacing between the boundaries of the two materials in that it is just fully contained within the material 26 of the matrix, and thus defines the approximate distance between adjacent metal-non-metal boundaries in the superconductor in the manner described below.

The superconducting devices of the present invention may be formed in accordance with any desired impregnating technique, which causes the preferably soft metal of the matrix to flow about the insulating particles. In constructing an elongated wire with substantially parallel filaments, as illustrated in FIGURES 2*a* and 2*b*, it is preferred that the composite be formed by a drawing technique. That is, a long strand of insulating material coated with the metal may be drawn through conventional dies which action tends to decrease the thickness of the metal and of the insulator. After each pass through the set of dies, the elongated strand is preferably cut into pieces of equal length and the resulting strands bundled together for the next pass through the set of draw dies. As many passes may be made as necessary to produce a bundle of fibers of filaments which are impregnated with the surrounding metal matrix. In addition, the strands may be twisted at one or more stages in the manufacture before the bundled strands are further elongated for reduction in diameter. The result is that filaments of insulating material become helical rather than straight. This tends to further inhibit vortex movement in the direction of the longitudinal axis of the wire and is most effective if before two successive stages of rebundling the strands are twisted in opposite directions. The result is similar to a rope laid in one direction and composed of strands laid in the other direction.

The pellet structure, as exemplified in FIGURE 3, is preferably formed in a hydraulic press where the material is compressed at elevated temperature and/or pressure in a cylinder between a pair of hydraulically driven pistons. The temperatures and pressures used are chosen in accordance with the particular materials forming both the matrix and the embedded particles. Ordinarily, the insulating material is first ground, condensed or otherwise formed as a powder, and the action of the hydraulic press is such as to flow the matrix around and through the interstices of the compacted particulate material.

The resulting compacted pellet, which may be of the type exemplified in FIGURE 3, may then be drawn into a wire if desired, and customarily coiled so as to form the windings in a superconducting circuit. It has been found that the pellets themselves are quite useful in the calibration of devices for measuring magnetic moments, since the pellets exhibit a standard magnetic moment of their own. That is, commercial devices for measuring magnetic moments employ a very intense magnetic field, and in view of the insensitivity of the superconductors of the present invention to intense magnetic fields, they may be used for calibration purposes at higher magnetic intensities. The pellet is first cooled so as to become superconducting and is then placed in a known magnetic field. Since a pellet of known size and shape has a standard magnetic moment, the pellet may be used this way to calibrate conventional systems used for measuring magnetic moment.

However, the principal application of the superconductor devices of the present invention is in the form of wires usually coiled to carry electrical currents so as to act as a source of a magnetic field in solenoids and other electromagnets. However, the superconductors and composite materials of the present invention also may be used for magnetic shielding, in the trapping of magnetic influx, and for a variety of other purposes in the manner of known superconductors.

Figure 4:
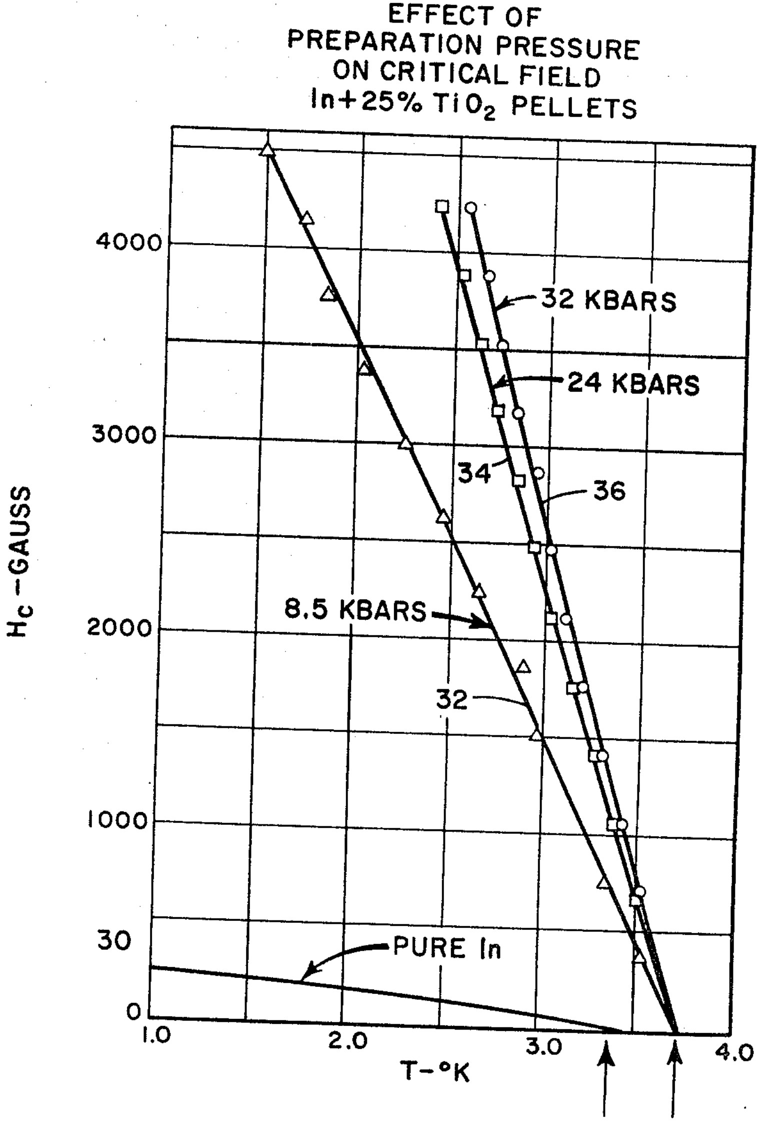
FIGURE 4 is a graph illustrating the effect of preparation pressure on the critical field cut off properties of superconductors formed in accordance with the present invention.

FIGURE 4 is a graph showing the effect of preparation pressure on the critical field for a pellet of the type illustrated in FIGURE 3 formed in a hydraulic press. The pellet consisted of 25 percent by weight titanium dioxide particles with the remainder of the pellet formed of indium. In FIGURE 4 magnetic field $Hc$ in gauss is plotted as function of temperatures T in degrees Kelvin. Line 30 in FIGURE 4 illustrates the critical field for pure indium, that is, the field which causes pure indium to go from the superconducting state to the non-superconducting state as a function of temperature. As can be seen, pure indium loses its superconducting properties even at low temperature when subjected to even relatively small magnetic fields. Line 32 in FIGURE 4 illustrates a pellet constructed in accordance with the present invention formed in a hydraulic press at a pressure of 8.5 kilobars and illustrates the substantially improved superconducting properties of the pellet in that it remains in the superconducting state at low temperatures, even when subjected to very intense magnetic fields. Lines 34 and 36 are similar plots for a 25 percent by weight of titanium dioxide indium pellet formed at pressures of 24 kilobars and 32 kilobars, respectively.

Figure 5:
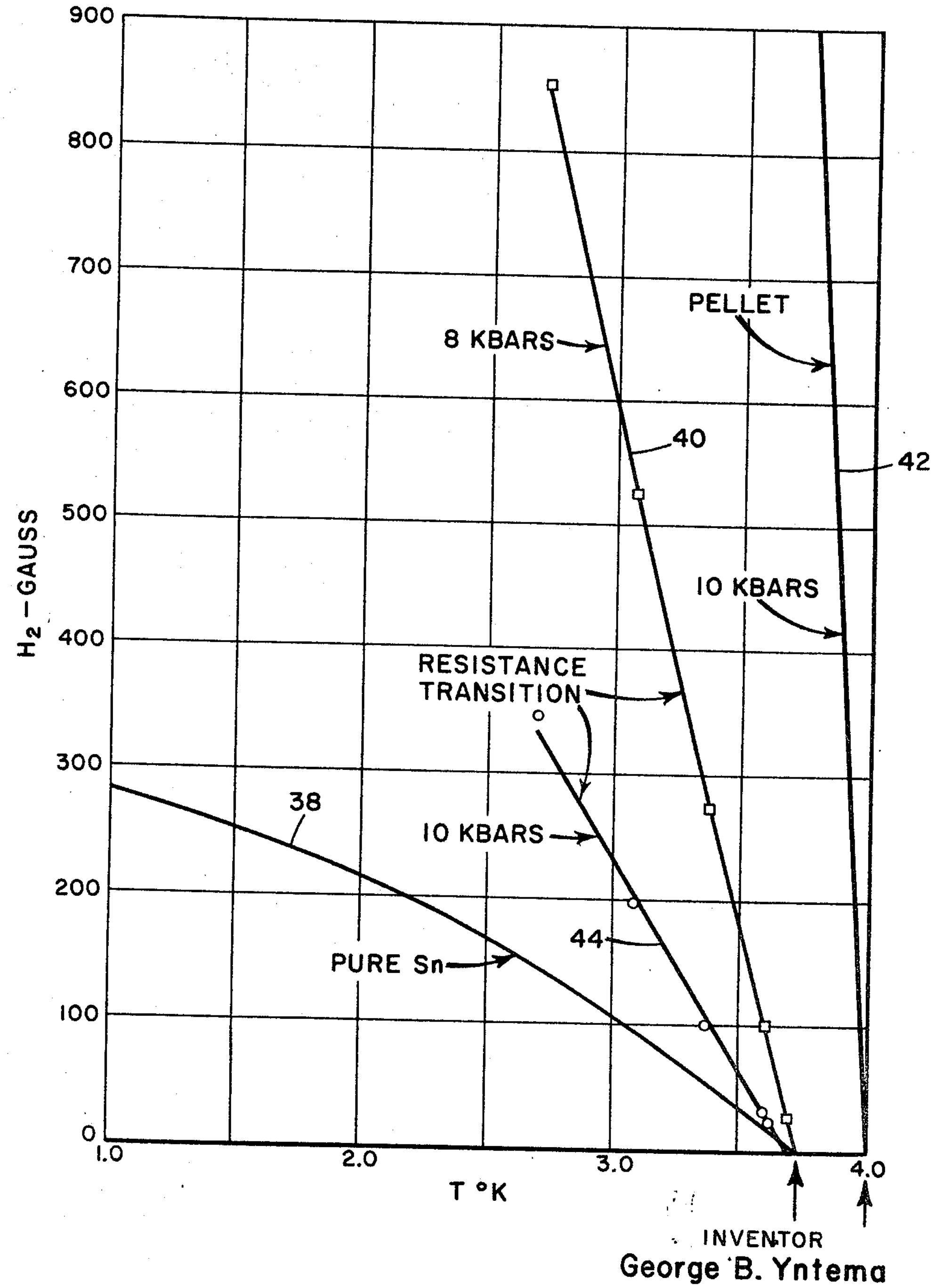
FIGURE 5 is a similar graph showing the effect of the pressure used in forming the material on the critical field for both a pellet and a wire drawn therefrom.

FIGURE 5 is a similar graph for a superconductor formed in accordance with the present invention, consisting of 25 percent by weight titanium dioxide particles and the remainder tin. Line 38 in FIGURE 5 illustrates the critical magnetic field at which pure tin changes from a superconductor to a non-superconductor at low temperatures. Line 42 illustrates the substantially increased insensitivity of a titanium dioxide tin pellet constructed in accordance with the present invention, formed in a press at a pressure of 10 kilobars. Curve 40 is a plot of a pellet with the same percentages of tin and titanium dioxide formed at a pressure or 8 kilobars and subsequently drawn into the form of a wire. Line 44 is a plot of the magnetic sensitivity of the same pellet illustrated by line 42 after the pellet had been drawn into the form of an elongated wire. It will be noted that the drawing process apparently results in some increase in sensitivity to magnetic fields.

Various potential superconductors have been used to form matrices in accordance with present invention, i.e., superconductors have been made utilizing indium, tin, lead, thallium and mercury for the superconductor matrix. Insulators in the form of various oxides such as aluminum oxide ($Al_2O_3$) and titanium dioxide ($TiO_2$) have been used. Superconductors having 25 percent, 50 percent and 75 percent by weight of insulator have been formed and all appear to exhibit the improved properties afforded by the present invention, although the lower percentage, i.e., 25 percent by weight of insulator, is presently preferred. For the metals which are solid at room temperature, pressures in the neighborhood of from one kilobar to thirty kilobars have been utilized to flow the metal around the insulating powder. In general, it appears that the higher the pressure utilized, the more pronounced are the desirable properties of the resulting superconductor. In the case of mercury which melts at approximately —39 degrees centigrade, the mercury was chilled to a solid in the hydraulic press before the pressure was released. Superconductors have been formed in accordance with the present invention at temperatures ranging from room temperature to slightly above the melting point of each of the superconductive metals listed above. In addition to the materials previously described superconductors in the form of tin wires impregnated with carbon powder have been manufactured and tested and evidence some significant increase in critical magnetic field. The pellets formed in the hydraulic press have been in the form of a right circular cylinder, having a one-quarter inch diameter and are approximately one-quarter inch long. The powdered material and metal were pressed between two pistons in a cylinder, all of which were formed of a hardened steel so as to withstand the elevated pressures indicated.

As previously mentioned, the particle size of the insulating material is to a certain extent critical in that it must not be too large in relation to the smaller of either (1) the penetration depth; or (2) the coherence length properties of the matrix material. In general, useful particle diameters may be expected to be on the order of from one-one thousandth micron to one micron, but is it believed that particles as large as a hundred microns will in some cases exhibit significantly improved results. Particle sizes ranging from approximately one-fortieth micron in diameter to sixty microns have been actually utilized in forming the superconducting composites of this invention. The smaller sizes are on the whole more advantageous, but of course more difficult to obtain and for this reason, a preferred range of particle size is on the order of one-hundredth of a micron up to one micron. In general, the particle diameter is preferably in the neighborhood of one order of magnitude less than the smaller of the two matrix parameters mentioned above. These parameters, namely, the penetration depth and coherence length vary depending upon the material of the matrix and in general, when one parameter is small, the other tends to be relatively large, although in a particular case either may be the controlling parameter for determining the particle size of the insulating material embedded in the matrix. A particle size in the ranges given above provides the desired close packing and hence optimum boundary spacing 16 illustrated in the drawings. The significance of close packing to the improvements evidenced by the composite superconductors herein disclosed is based upon investigations into the nature and mechanisms of superconductivity.

Although present knowledge is not complete in all details concerning the physical state of materials which provide geometrically continuous regions of superconductivity nor in all details concerning the degradation of energy within superconductors, some important features are understood at least qualitatively. One such feature is the relation between the fact that a sufficiently intense magnetic field destroys superconductivity in a sample and the fact that a superconducting sample tends at least partially to exclude magnetic field from its interior. This relation results from the fact that the free energy of a sample increases if magnetic field is excluded by it from its interior. If the amount of field excluded by the sample in a superconducting state is sufficiently great, then the free energy of that superconducting state is greater than the free energy of the normal (i.e., not superconducting) state. The state of lower free energy is the more stable. Samples which retain at least regions of superconductivity in intense magnetic fields do so by virtue of the fact that, as described below, the magnetic field is only slightly excluded from even the super-conducting regions of such samples.

Another feature which is qualitatively understood is that a magnetic field applied to a sample which is partially or completely superconducting penetrates a short distance into even the regions of superconductivity. The distance of this penetration is described, at least roughly, by a parameter which is known as the penetration depth. The magnitude of the penetration depth depends mainly on the nature of the material and on the temperature. There are two known ways whereby the intensity of magnetic field required in order to destroy superconductivity in a sample may be significantly increased by exploitation of this fact that the field penetrates a short distance into superconducting regions. One of these ways requires that the geometrical shape of the sample be such that there are regions of potentially superconducting material which are narrow in at least one direction perpendicular to the direction of the magnetic field. In this context the word narrow is intended to mean having width not greater than the penetration depth. The penetration of magnetic field into such regions implies that they can stay superconducting in stronger magnetic fields than could wider regions of the same material at the same temperature. The other way requires that when the magnetic field is sufficiently intense the material should be in some member of a family of states which are known as mixed states. In a mixed state there are filamentary regions of reduced superconductivity or of no superconductivity which run through the material. Each such region is associated with a small quantity of magnetic flux which follows it through the material. Each of these filamentary regions which has associated magnetic flux is referred to as a vortex, because on any contour which encloses such a region it makes a non-zero contribution to the circulation of the gradient of the phase of the superconducting order parameter. When many such regions are formed into an array in which they are approximately parallel to each other and in which the spacing between adjacent filamentary regions is small compared to the penetration depth, then the magnetic field is only weakly excluded from the remain-the material which lies between the filamentary regions of reduced superconductivity or of no superconductivity. A mixed state provides a geometrically continuous path of superconducting region in any direction in the material. There is a class of materials, known as Type II superconductors, in which at certain combinations of temperature and of intensity of applied field such mixed states are stable by virtue of having lower free energy than either the completely superconducting state or the completely normal (i.e., not superconducting) state. The intensity of magnetic field required in order to destroy superconductivity in a Type II superconductor is greater than the intensity at which the free energy of the completely superconducting state becomes greater than the free energy of the completely normal (i.e., not superconducting) state. In previously known Type II superconductors the fact that a mixed state has low free energy, and hence the fact that an intense magnetic field is required in order to destroy superconductivity, depends on a certain property of the material, namely the property that the spatial transition within the material between a superconducting region and a region of reduced superconductivity or of no superconductivity can be abrupt in the sense that such a transition can occur within a distance which is small compared to the penetration depth. The minimum distance within which such a transition can occur is described by a parameter called the coherence length. The magnitude of the coherence length depends mainly on the nature of the material and on the temperature.

Another feature which is qualitatively understood is the process by which electrical or magnetic energy is degraded into heat in a superconductor. Such degradation occurs when an interface between a superconducting region and a non-superconducting region moves within a potentially superconducting material. Such degradation also occurs when one or more of the vortices in a mixed state moves. An electric current passing through a material in a mixed state applies a force on the vortices, unless the electric current runs exactly parallel to the vortices. If motion of the vortices is not prevented by some other feature of the situation this force leads to degradation into heat of some of the electrical or magnetic energy which is associated with the electric current. The motion of the vortices may be inhibited by various factors which render the free energy of the sample sensitive to the exact positions of the vortices. The motion is prevented by these factors if the density of electrical current which applies a force to the vortices is not too great.

Previously known Type II superconductors have been various materials. They have in common the feature that the type of electrical conductivity (whether superconducting or not superconducting) which is characteristic of metals is exhibited throughout each specimen. In such materials the dependence of the free energy of the material on the positions of the vortices is due to either or both of two features. One of these features is the existence of roughness in the surface of the material. If a vortex meets the surface at a depression in the surface then the vortex is shorter and the free energy of the material is correspondingly lower than if the vortex meets the surface at a hump. The other of these features is the existence of variations from place to place within the material of the properties of the material as a potential superconductor. Such variations are thought to come about from various causes. Some of these causes are: variations in the state of mechanical train of the material; variations in the impurity content of the material; variations in the proportions of the constituents of an alloy material; or variations in crystallographic phase of the material. In previously known Type II superconductors the effectiveness of these variations as inhibitors of the motion of vortices is limited by the fact that the variations existing are limited to those sorts of variations which can exist among various regions in each of which the mechanism of electrical conductivity is of the type (whether superconducting or not superconducting) which is characteristic of metals.

The present invention provides a composite material which is formed by embedding many fine granules or many fine filaments of an electrically insulating or semi-conducting material within a material which is potentially superconducting at the temperatures of intended use so that the composite material has the property of providing a geometrically continuous region of superconductivity in more intense magnetic fields than would the potentially superconducting material alone or so that the composite material has the property of transmitting electrical current of great density without the degradation of electrical or magnetic energy into heat or so that the composite material has both of these properties. By potentially superconducting material I mean any material which in negligible magnetic field exhibits superconductivity at the temperatures of intended use of the composite. By insulating or semi-conducting material I mean any material which, at the temperatures of intended use of the composite, exhibits neither superconductivity nor normal (i.e., not superconductive) electrical conductivity of the sort which is characteristic of metals. By a material exhibiting conductivity of the sort characteristic of metals I means those materials in which electrical conduction is by a Fermi sea of electrons in one or more unfilled bands of unbound electron states. The potentially superconducting material surrounds the granules or the filaments so that it forms a single, continuous, multiply connected piece. The granules or the filaments may touch each other or not touch each other. The granules or the filaments, whichever are used, need not be uniform in size nor in shape. The only restrictions on the size and shape of the granules or of the filaments are those restrictions which are implied by the requirement, described below, of close packing. These restrictions on size and shape and the requirement of close packing apply only if the intended service of the composite material is such that it is necessary that the composite material shall exhibit superconductivity in magnetic fields of significantly greater intensity than that which would be just sufficient at the same temperature to destroy superconductivity in a large simply connected specimen composed solely of the potentially superconducting material. In this context a large specimen is one in which all dimensions are much greater than the penetration depth at the temperature of use. The composite may be fabricated by any method by which a satisfactory geometrical configuration, as described above, may be achieved within the composite material. Such fabrication methods include, but are not restricted to, the following examples: causing material, which at the temperatures of intended use is potentially superconducting, but which at the temperature of fabrication is molten, to flow into the spaces between granules of an insulating or semi-conducting material which is in powder form; pressing a potentially superconducting material which is solid but relatively soft into the spaces between granules of an insulating or semi-conducting material which is in powder form and is relatively hard; drawing a composite wire in which a ductile potentially superconducting material surrounds filaments of a maleable insulating or semi-conducting material, and repeating the drawing until the filaments are close together compared to the penetration depth at the temperatures of intended use; or causing granules of an insulating or semi-conducting material to be precipitated in dispersed form by appropriate heat treatment from supersaturated solid solution in the material which at the temperature of intended use is potentially superconducting.

There is a requirement, mentioned above, that the granules or filaments which are embedded in the potentially superconducting material must be closely packed if it is necessary that the composite material shall exhibit superconductivity in magnetic fields of significantly greater intensity than that which would be just sufficient at the same temperature to destroy superconductivity in a large simply connected specimen composed solely of the potentially superconducting material. In this context a large specimen is one in which all dimensions are much greater than the penetration depth at the temperature of use. In order to specify this requirement of close packing more precisely I next define a special meaning for the statement that a point is in a narrow part of the potentially superconducting material. I use this statement to mean that the two following conditions are both satisfied. The first condition is that the point is in the potentially superconducting material. The second condition is that the point is not included in any spherical volume which is completely filled with the potentially superconducting material and of which the radius is greater than the lesser of the penetration depth and the coherence length of the potentially superconducting material at the temperatures of intended use. The requirement of close packing may be stated as the requirement that, wherever a geometrically continuous superconducting path is required to exist through the composite material in a magnetic field of intensity which is significantly greater than that which would be just sufficient to destroy superconductivity in a large simply connected specimen composed solely of the potentially superconducting material, there must exist along the path a geometrically continuous region which is composed entirely of points which are in narrow parts of the potentially superconducting material.

The effect of the configuration of materials which is achieved by embedding many fine pieces of an electrically insulating or semi-conducting material within a matrix of potentially superconducting material is to cause the free energies of certain mixed (in the sense that there are closed contours on all parts of which there is superconductivity and on which there is non-zero circulation of the gradient of the phase of the superconducting order parameter) states of a specimen of the composite material to have particularly low free energies in appropriate magnetic fields. These states of low free energies are those in which a significant fraction of the total length of the vortices lies in the non-metallic pieces. The free energies of such states are low because in these states the boundaries of the superconducting region coincide to a great extent with the boundaries of the potentially superconducting material. A boundary of the superconducting region contributes less to the free energy of the specimen if the boundary coincides with a boundary of that part of the specimen which exhibits electrical conductivity (whether superconductive or not superconductive) of the sort which is characteristic of metals than if the boundary involves a spatial transition between superconductivity and reduced superconductivity or between superconductivity and no superconductivity within a part of the specimen which exhibits electrical conductivity of the sort which is characteristic of metals. Such a spatial transition within a part of the specimen which exhibits metallic conductivity contributes strongly to the free energy of the specimen. If one of the mixed states which has particularly low free energy is slightly modified by motion of the vortices in such a way as to increase the portion of the total length of vortices which lies in the potentially superconducting material then the free energy of the specimen is sharply increased. The sharpness of this increase implies that extremely large forces are required in order to move the vortices if, as is usually the case, the vortices are crowded together so that all the vortices in a neighborhood must move whenever any of them moves very far and so that it is not possible for the vortices to perform extensive selective motions which avoid sharp increases in the free energy. Motion of vortices is the principal mechanism by which electrical or magnetic energy is degraded into heat. Thus the composite material of the configuration here disclosed transmits electrical currents of great density without degradation of electrical or magnetic energy into heat. If the configuration within the composite material satisfies the previously described requirement of close packing then the configuration has the additional effect that the composite material provides a geometrically continuous region of superconductivity in magnetic fields so intense that they would destroy superconductivity in a large simply connected specimen composed solely of the potentially superconducting material.

The advantages of the configuration of materials which is achieved by embedding many fine pieces of an electrically insulating material or of a semi-conducting material within a matrix of a potentially superconducting material are as follows:

(a) This configuration of materials inhibits the degradation of electrical or magnetic energy into heat. Such degradation tends to occur when an electric current is transmitted by a potentially superconducting material which is in a state in which vortices exist in the material.

(b) The potentially superconducting component material in the composite is accessible at the surface of the composite for the attaching of any electrical connections which may be required.

(c) The improvements in superconducting performance which are due to this configuration of materials in the composite may be realized with any of a large number of combinations of various potentially superconducting materials with various insulating or semi-conducting materials. Therefore, materials may be selected on the basis of their advantages for particular applications. For example, if large quantities of composite material are required then component materials of low cost can be selected.

(d) If the previously described requirement of close packing is satisfied then the composite material provides a geometrically continuous region of superconductivity in magnetic fields so intense that they would destroy superconductivity in a large simply connected specimen composed solely of the potentially superconducting component material.

(e) There is a particular class of variations of this configuration of materials which provides to an exceptional degree the advantages listed above as (a) and (d). This class of variations are those in which the insulating or semi-conducting material is in the form of filaments which are directed approximately parallel to the magnetic field. In this variation the composite can assume particularly advantageous mixed (in the sense that there are closed contours on all parts of which there is superconductivity and on which there is non-zero circulation of the gradient of the phase of the superconducting order parameter) states in which vortices run mostly along the filaments.

The embedding of fine pieces of an electrically insulating or semi-conducting material into a matrix of a potentially superconducting material so as to produce a composite material of superior superconducting properties has three novel aspects. The first novel aspect is that the formation of vortices is promoted by providing non-metallic inclusions through which the vortices may pass. In prior practice the formation of vortices has been promoted by providing a large ratio of penetration depth to coherence length. The second novel aspect is that the positions of vortices are stabilized by providing non-metallic inclusions through which the vortices may pass. In prior practice the position of vortices has been stabilized by providing variations from region to region within a metal of the properties of that metal as a potential superconductor. The third novel aspect occurs in composites in which the requirement of close packing is satisfied. In these composites the upper limit of intensity of magnetic field at which superconductivity is exhibited is significantly increased by providing effectively narrow regions of potentially superconducting material by the use of non-metallic inclusions. In prior practice narrow regions of potentially superconducting material have been provided by forming the potentially superconducting material into fine filaments or into thin films.

To summarize, what this invention provides that is important for conduction of supercurrents either in strong magnetic fields or with high average current density, or both, is surfaces between non-metal and superconducting metal that are so placed as to stabilize the boundaries of the superconducting regions in the required places. The required places are those such that large values of curl of current density in these places, and on vortex lines connecting them, make it possible that the London equation be obeyed everywhere else in superconducting regions running the length of the wire without the critical magnitude of supercurrent density being exceeded anywhere. There is provided a superconducting region running the length of the wire or other superconductor. Its ability to remain superconducting in the presence of strong magnetic fields or of large average current densities, or both, is provided by its being penetrated by holes consisting of non-superconducting regions or by vortex lines. The non-superconducting holes coincide with, or are anchored on, regions of non-metallic material. Where there are vortex lines they too are anchored on pieces or filaments of non-metallic material. The innovation in this invention, is the provision of interfaces between superconducting and non-metallic regions to stabilize the positions of vortex lines and of surfaces between superconducting and non-superconducting regions. Formerly known wires have used variations and distortions within metals for the same purpose. However, the interfaces between non-metals and metals capable of superconduction at the temperature of use provide for greater stability that do variations within metallic regions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composite material for superconductors comprising a matrix of potentially superconducting material surrounding solid, discrete particles of a material which is not potentially superconducting and which does not exhibit that normal type of electrical conduction characteristic of metals.

2. A composite material according to claim 1 in which said matrix is metallic and said particles are formed of electrical insulating material.

3. A composite material according to claim 1 in which said matrix is metallic and said particles are formed of semiconductive material.

4. A composite material according to claim 1 in the form of a wire.

5. A composite material according to claim 1 in the form of a pellet.

6. A composite material according to claim 1 wherein said particles are in the form of parallel filaments.

7. A composite material according to claim 1 wherein said particles are in the form of granules.

8. A composite material according to claim 1 wherein said particles have a size ranging from about 1/1000 micron to about 100 microns.

9. A composite material according to claim 8 wherein said particles have a size ranging from about 1/200 micron to about 1 micron.

10. A composite material according to claim 1 wherein the statistical average of the spacing between adjacent surfaces of said particles is less than both the penetration depth and the coherence length of said matrix material.

11. A composite material according to claim 1 wherein said particles are closely packed in said matrix such that wherever a geometrically continuous superconducting path is required to exist through the composite material in a magnetic field of intensity which is significantly greater than that which would be just sufficient to destroy superconductivity in a large simply connected specimen composed solely of said matrix material, there exists along the path a geometrically continuous region which is composed entirely of points in portions of said matrix material which portions are narrower than both the penetration depth and the coherence length of said matrix material.

References Cited

UNITED STATES PATENTS

| | | | |
|---|---|---|---|
| 3,214,249 | 10/1965 | Bean et al. | 29—180 |
| 3,301,643 | 1/1967 | Cannon et al. | 29—195 |
| 3,317,286 | 5/1967 | De Sorbo | 29—183.5 |

L. DEWAYNE RUTLEDGE, *Primary Examiner.*

E. L. WEISE, *Assistant Examiner.*

U.S. Cl. X.R.

29—191.4, 599